May 16, 1933. H. C. KELLER ET AL 1,909,492

CONVEYER

Filed June 20, 1930 2 Sheets-Sheet 1

Inventors.
Henry C. Keller.
Maynard Van Billiard.
by Roberts Cushman & Woodbury
Attys.

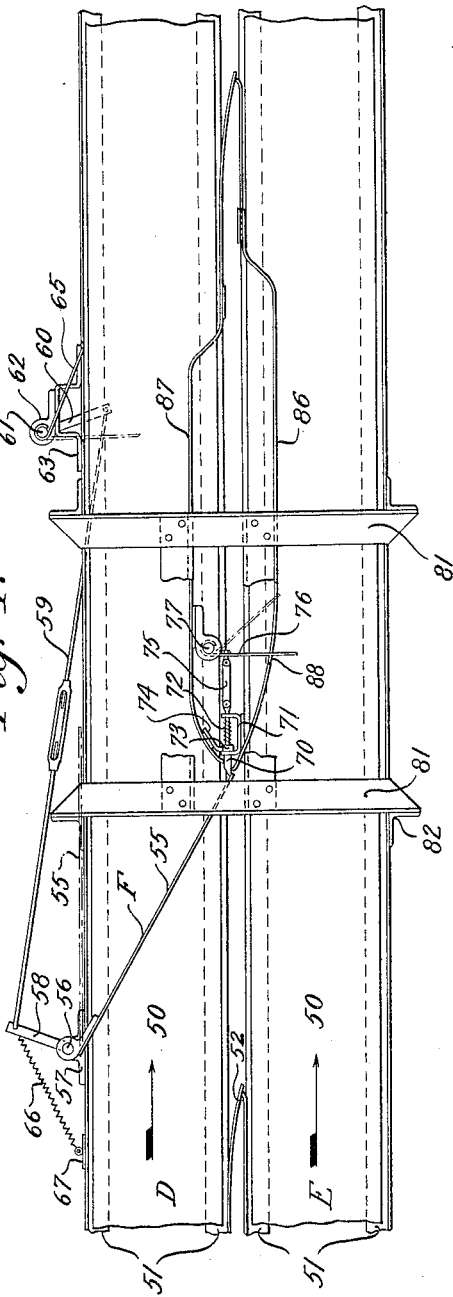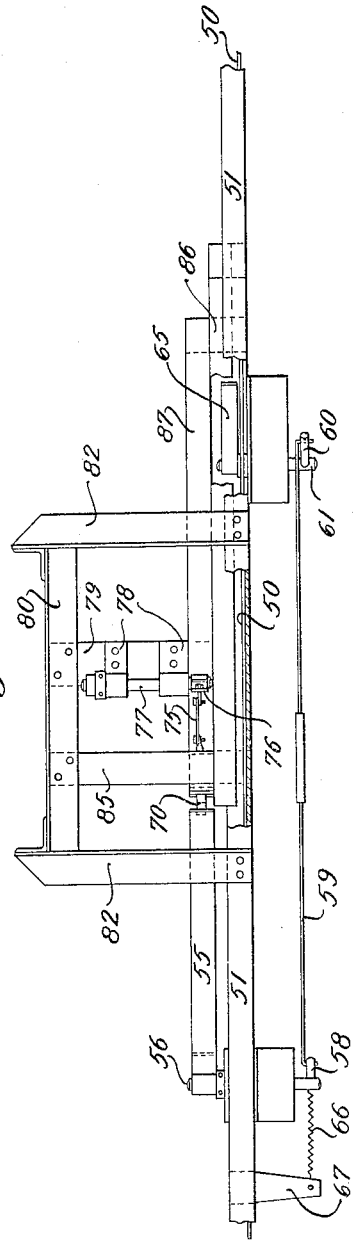

Patented May 16, 1933

1,909,492

UNITED STATES PATENT OFFICE

HENRY C. KELLER, OF SYRACUSE, NEW YORK, AND MAYNARD VAN BILLIARD, OF PHILADELPHIA, PENNSYLVANIA, ASSIGNORS TO THE LAMSON COMPANY, OF SYRACUSE, NEW YORK, A CORPORATION OF MASSACHUSETTS

CONVEYER

Application filed June 20, 1930. Serial No. 462,455.

This invention relates to an improvement in conveyers and more particularly in means for deflecting articles transported thereby.

The primary object of this invention is to provide means whereby a stream of articles traveling along a conveyer are so treated at a station that alternate articles are moved out of the stream. A further object of this invention is to provide deflector mechanism which acts upon the articles transported in a stream by a conveyer to deflect alternate articles therefrom which deflector is automatically actuated by each article in its travel after passing the deflector mechanism.

Figure 1:
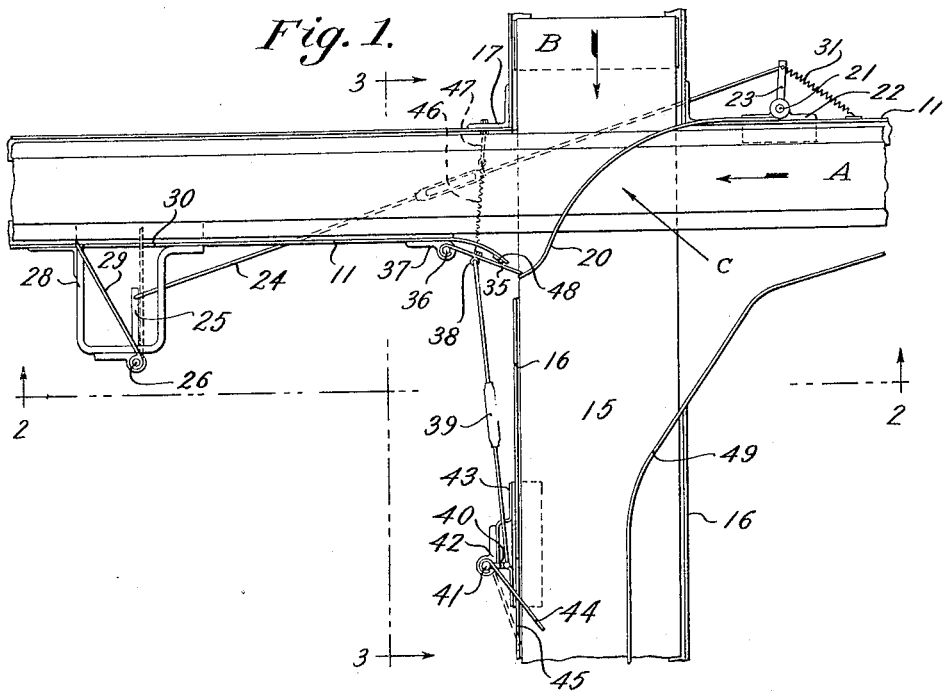
Figure 2:
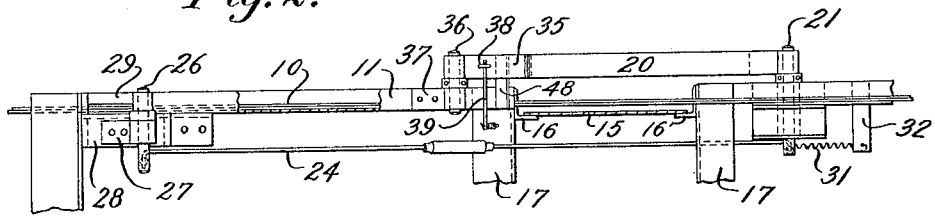
Figure 3:
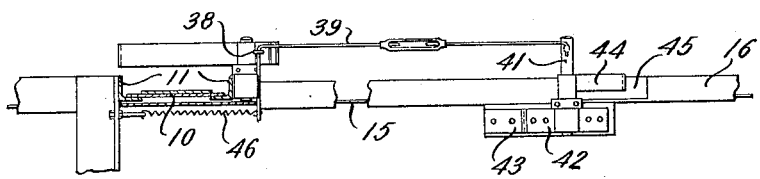

Two embodiments of this invention are described in the following specification and disclosed in the accompanying drawings which form a part thereof and in which:

Fig. 1 is a plan view of one embodiment of this invention, in which the articles operated upon by the deflector are transferred at a deflecting station to a conveyer traveling at an angle to the main conveyer;

Figs. 2 and 3 are sectional views of this embodiment taken along the lines 2—2 and 3—3 of Fig. 1;

Fig. 4 is a plan view of another embodiment of this invention in which the articles are transferred at a deflecting station from one conveyer to a second conveyer traveling parallel thereto; and Fig. 5 is a side elevation of the construction shown in Fig. 4 with parts being broken away.

In the embodiment shown in Figs. 1, 2 and 3, the articles are fed in a stream to the deflecting station C by a conveyer A which may be of any desired type, comprising in this embodiment a belt 10 traveling upon and between flanges side rails 11, the belt 10 being driven by any well known means. At an angle to the conveyer A, at the station C is a second conveyer B also shown, of the same type as conveyer A and comprising a belt 15 traveling upon and between flanged side rails 16. The side rails 11 and 16 are suitably supported upon uprights 17. The articles traveling upon the conveyer A in the direction indicated by the arrow in Fig. 1 are operated upon by a deflector mechanism located at station C, the juncture of the conveyers A and B.

The deflector mechanism comprises a curved deflector gate 20 mounted upon a shaft 21 which is supported in advance of station C in bearings 22 carried by one of the side rails 11 of the conveyer A. Projecting from the shaft 21 near the lower end thereof is an arm 23 connected by a link 24 with an arm 25 projecting from a shaft 26, mounted in a journal bearing 27 on a bracket 28 suitably supported by the opposite side rail 11 of the conveyer beyond station C. Carried by the upper end of the shaft 26 is a finger 29 which in one position (shown in dotted lines) projects, through an opening 30 in the side rail, over the conveyer belt 11 and into the path of travel of the articles thereon.

A spring 31 secured at one end to the arm 23 and at the other end to a bar 32 depending from the side rail 11 normally tends to hold the deflector gate 20 out of the path of the articles traveling along the conveyer A. As shown in Fig. 1, however, the deflector gate 20 is in the functioning position being held there by the engagement of the tip of the gate with a latch formed by the tip of a bar 35 mounted upon a shaft 36 carried by a bearing 37 on the side rail 11. Intermediate its length, the bar 35 is provided with a loop 38 which is engaged by one end of a link 39. The other end of the link 39 is fixed to an arm 40 on a shaft 41 carried in a bearing 42 supported on a bracket 43 fixed to the side rail 16. A finger 44 on the shaft 41 may extend, as shown in full lines, through a slot 45 in the side rail 16, into the path of travel of the articles on conveyer B. A spring 46 attached at one end to the link 39 and at the other end to an eyelet 47 carried by one of the uprights 17 normally tends to hold the bar 35 in the position shown in the drawings, its movement being limited by a stop 48 mounted on the side rail 11. The various elements described which connect the fingers 29 and 44 to the deflector gate 20 and through which the position of the gate 20 is controlled will be hereinafter referred to generically as the control mechanism.

With the parts set in the position shown in full lines in Fig. 1, an article traveling upon the conveyer A will be deflected at station C by the gate 20 onto the conveyer B and be transported by that conveyer in the direction indicated by the arrow. A guide plate 49 is provided which extends over the conveyer belt 15 and thus causes the article to contact with and trip the finger 44. This movement of the finger acting through the control mechanism swings the bar 35 on its axis against the urge of the spring 46 and out of contact with the tip of the gate 20 so that the gate 20 is swung by the spring 31 into a position out of the path of travel of the articles on the conveyer A. The movement of the gate 20 causes the arm 23 to be swung to the right in Fig. 1 and accordingly through the link 24 shifts the finger 29 from the full line position shown in Fig. 1 into the dotted line position. The succeeding article traveling upon the conveyer A will, of course, pass through the station C and continue its progress unimpeded along the conveyer until it comes into contact with the finger 29. The finger will then be caused to move from the dotted line position into the full line position and will thereupon actuate the control mechanism to return the gate 20 into the full line position so that when the next article arrives at station C it will be deflected. It will be understood, of course, that if alternate articles in the stream on the conveyer A approaching the station C are to be deflected they will have been spaced by any suitable mechanism (not shown) so that they will not interfere with the operation of the gate 20 above pointed out.

In the embodiment shown in Figs. 4 and 5 the articles are supplied at station F by a conveyer D and alternate articles are to be deflected from the stream of articles onto a conveyer E which is parallel to the conveyer D and travels in the same direction. The conveyers D and E here shown are also of the belt type each comprising a belt 50 which travels upon and between flanged side rails 51. The vertical portions of the side rails terminate at the station F, so that the articles can be transferred freely from one belt to the other.

The deflector mechanism comprises a gate 55 fixed upon a shaft 56 carried in a journal bearing 57 on one of the side rails 51. An arm 58 projecting from the shaft 56 is connected by a link 59 with an arm 60 projecting from a shaft 61 mounted beyond the station F in a journal bearing 62 carried by a bracket 63 fixed to one of the side rails 51. The vertical portion of the side rail 51 is broken away at the bracket 63 to provide an opening 64 through which a finger 65 carried by the shaft 61 may project into the path of travel of the articles upon the conveyer D. A spring 66 connected at one end to the arm 58 and at the other end to a post 67 depending from a side rail 51 normally acts to move the gate from the position shown in full lines in Fig. 4 to the position shown in dotted lines therein. The gate is held in the full line position by a latch formed by a plunger 70 which is mounted to reciprocate in a supporting bracket 71, being normally urged into the forward position by a spring 72, which bears upon a collar 73 on the plunger 70. The rear end of the plunger 70 is connected by a link 75 with a finger 76 fixed upon a shaft 77 carried in bearings 78 upon a vertical strap 79. The strap 79 depends from an angle bar 80 suitably supported on cross bars 81, which extend across the conveyers D and E and are carried by angular uprights 82. A strap 85 depending from a bar 80 carries the bracket 71 and acts with the strap 79, to support guide rails 86 and 87 which extend between the belts 50. The guide rail 86 is cut away at 88 so that the finger 76 will project into the path of travel of the articles over the conveyer E and be tripped thereby. Guide plate 87 acts to direct the articles on the conveyer D so that they will not pass the finger 65 without tripping it. As in the previous embodiment the elements by which the fingers 65 and 76 are connected to the gate 55 by which the position of the gate is controlled will be hereafter referred to as the control mechanism.

The operation of this embodiment is very similar to that of the first embodiment. The articles originally travel to the deflecting station F over the conveyer D and with the deflector gate 55 at the position shown in full lines the first article to arrive at this point is transferred to the conveyer E. This article being transported by the conveyer E in the direction indicated by the arrow trips the finger 76 swinging it from the full line position to the dotted line position in Fig. 4 and accordingly through the link 75, retracting the latch plunger 70 so that the deflector gate 55 is free to move into the dotted line position under the influence of the spring 66 in which position it does not in any way interfere with the travel of the articles on conveyer D. The next article accordingly will continue to pass along the conveyer D and trip the finger 65 which is at that time projecting into the path of travel as shown in dotted lines in Fig. 4. The article upon engaging the finger 65 swings it into the full line position of Fig. 4 and through the arm 60, link 59 and arm 58 swings the deflector gate 55 back into the full line position of Fig. 4, in which it is held by the latch plunger 70, so that upon the arrival of the next article at the deflecting station F it will be deflected onto the conveyer E.

The broad feature of this invention as set forth in the illustrative embodiments herein set forth is that the articles, after passing through the deflecting station, actuate mechanism by which the position of the deflector gate is controlled, thereby being distinguished from the old and well known construction in which the deflected articles alone actuate such control mechanism or that in which the control mechanism is actuated by articles as they approach the deflecting station. It will be understood that while in the selected embodiments the articles are deflected to branch conveyers, the articles might be deflected onto a platform or any other suitable receiving station and that furthermore instead of deflecting alternate articles the number of articles can be regulated by changing the location of the article tripped fingers relative to the station. Other changes may be made without departing from the spirit and scope of the invention as set forth in the following claims.

We claim:

1. The combination with a main conveyer over which a stream of articles are transported, of a branch conveyer to which the articles on the main conveyer may be transferred at a deflecting station, a movable gate at such station which in its normal position permits the articles to continue their progress unimpeded over the main conveyer and in another position transfers articles from the stream to the branch conveyer, and control mechanism for determining the position of the gate including a spring for holding the gate in its normal position, a latch for holding the gate in its functioning position and elements associated with each conveyer and actuated by articles that have passed through the deflecting station, the element associated with the main conveyer causing the gate to be swung into its functioning position and the element associated with the branch conveyer releasing the latch and allowing the spring to return the gate to its normal position.

2. The combination with a conveyer by which articles are transported to a deflecting station, of a deflector at said station, which deflector in one position permits the articles to continue their progress over the conveyer and in another position deflects articles from the conveyer, said deflector being normally in that position in which the articles are permitted to continue their progress over the conveyer, means including a trip engaged by such an article after passing through said station for positively moving the deflector into the abnormal position and a latch for holding the deflector in such position.

3. The combination with a conveyer by which articles are transported to a deflecting station, of a deflector at said station, which deflector in one position permits the articles to continue their progress over the conveyer and in another position deflects articles from the conveyer, said deflector being normally in that position in which the articles are permitted to continue their progress over the conveyer, means including a trip engaged by such an article after passing through said station for positively moving the deflector into the abnormal position, a latch for holding the deflector in such position, and a trip engaged by an article after passing through such station with the deflector in its abnormal position for releasing said latch whereby said means returns the deflector to its normal position.

4. The combination with a conveyer by which articles are transported to a deflecting station, of a deflector at said station comprising a movable gate which, in one position, permits the articles to continue their progress over the conveyer unimpeded and, in another position deflects articles from the conveyer, one end of which gate is pivotally mounted at one side of the conveyer, spring means acting upon that end of the gate and normally holding the gate in one of said positions, means beyond the station including a trip one end of which is pivotally mounted at one side of the conveyer while the free end extends into the path of travel of articles on the conveyer, a connection between the pivoted end of the trip and the pivoted end of the gate whereby when the trip is engaged by an article the gate is swung into the other position, and a latch which engages the free end of the gate and holds it in said last named position.

5. The combination with a conveyer by which articles are transported to a deflecting station, of a deflector at said station comprising a movable gate, which, in one position, permits the articles to continue their progress over the conveyer unimpeded and, in another position deflects articles from the conveyer, one end of which gate is pivotally mounted at one side of the conveyer, spring means acting upon that end of the gate and normally holding the gate in one of said positions, means beyond the station including a trip, one end of which is pivotally mounted at one side of the conveyer while the free end extends into the path of travel of articles on the conveyer, a connection between the pivoted end of the trip and the pivoted end of the gate whereby when the trip is engaged by an article the gate is swung into the other position, a latch which engages the free end of the gate and holds it in said last named position, and means beyond the station including a trip, one end of which is pivotally mounted at one side of the conveyer while the free end extends into the path of travel of articles on the conveyer and a connection between the latch and the pivoted end of the trip whereby when the trip is engaged by an article the latch is retracted and the deflector gate is swung by its spring means into its normal position.

Signed by HENRY C. KELLER at Syracuse, N. Y., this 16th day of June, 1930, and by MAYNARD VAN BILLIARD at Syracuse, N. Y., this 18th day of June, 1930.

HENRY C. KELLER.
MAYNARD VAN BILLIARD.